July 24, 1956  H. A. MULVANY  2,755,834
ELECTRICAL CRACKING OF HARD SHELLED NUTS
Filed Nov. 3, 1951
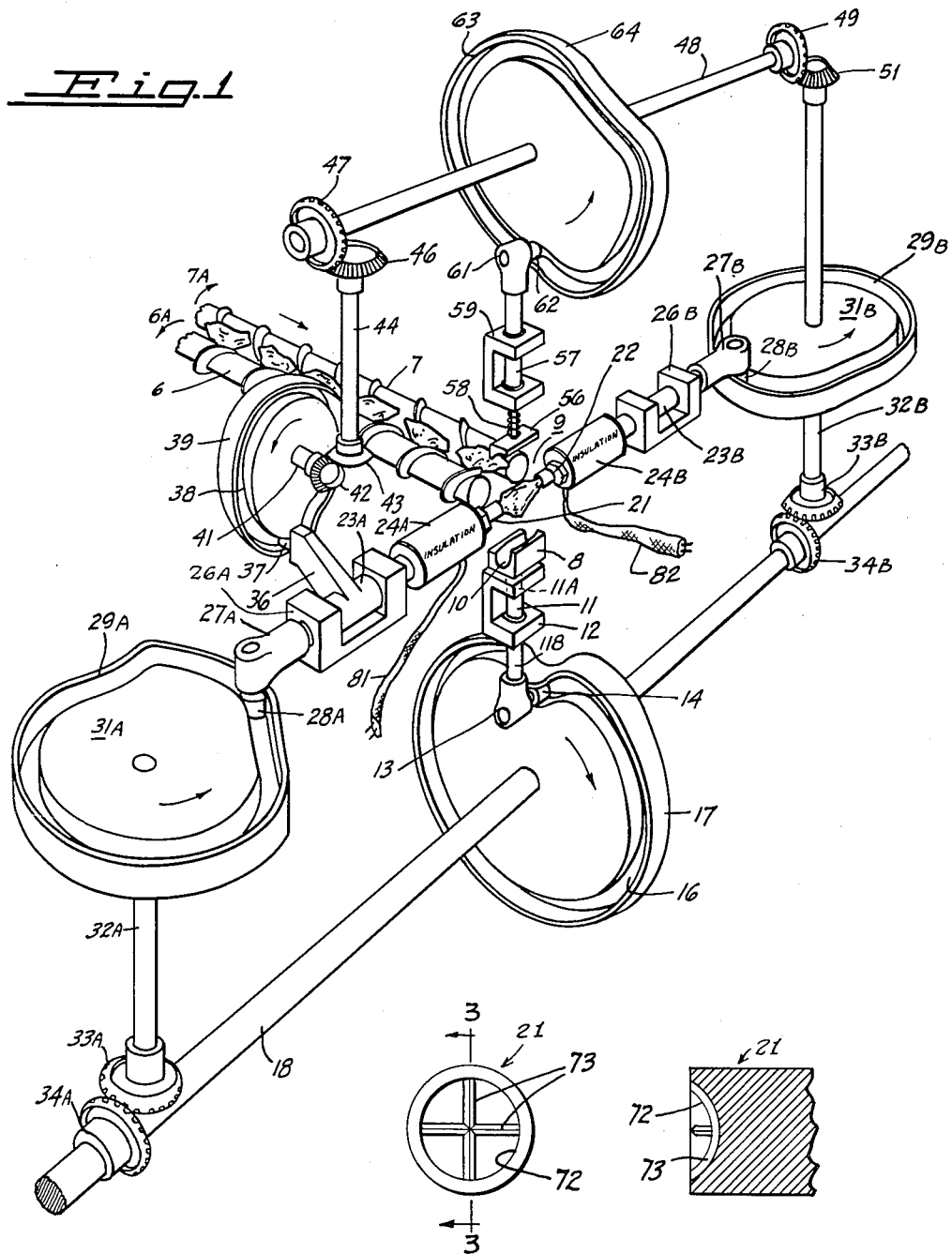
INVENTOR.
Harry A. Mulvaney
ECKHOFF & SLICK
ATTORNEYS United States Patent Office 2,755,834
Patented July 24, 1956

2,755,834

ELECTRICAL CRACKING OF HARD SHELLED NUTS

Harry A. Mulvany, Berkeley, Calif.

Application November 3, 1951, Serial No. 254,747

8 Claims. (Cl. 146—8)

This invention relates to the cracking and shelling of nuts.

It has heretofore been proposed to crack the walnuts by engaging the nut on opposite sides with two sharpened electrodes, forcing these slightly into the nut to make good contact therewith and then subjecting the nut suddenly to a substantial electrical potential. The electrode life is relatively short and under conditions of commercial use they must be changed after about eight hours of operation; on hard nuts such electrodes merely chip the nut meat.

When it was attempted to use the described operation on the cracking of relatively hard nuts such as filberts, Hawaiian Macadamians and Brazilian babassu nuts, the potential required was such that unless the nut is submerged in a medium having a higher resistance than air, then the discharge follows the nut surface and the nut is not affected. The submerging of each nut in a liquid having a resistance greater than air, such as water, oil or a halogenated hydrocarbon bath, is not practical.

I have found that tough, hard nuts such as filberts, the Hawaiian Macadamians and Brazilian babassu nuts can be cracked satisfactorily without damage to the kernel or meat if the nut shell is under considerable stress when the potential is applied. I have cracked the hardest nuts successfully by subjecting the nut to a pressure application and to a torsional force and simultaneous application of a surge electrical potential. For example, I have found that the Hawaiian Macadamian can be cracked successfully if it is subjected to a pressure of the order of 500 pounds per square inch and if, simultaneously, it is subjected to an instantaneous electrical discharge of the order of 40,000 volts from a capacitor of 0.25 microfarad. The shell of the nut parts, leaving the unblemished kernel fall free. By subjecting Brazilian babassu nuts to a pressure of the order of several tons and applying a torsion force so that the nut fibers are under great stress, I have been able to crack the nuts successfully with a voltage of only 40,000 volts and a capacitor of a capacity of ½ microfarad, this without damage to the nut kernels.

It is in general the broad object of the present invention to provide for the cracking of relatively hard or difficultly cracked nuts like filberts, Macadamian, babassu nuts and the like.

Another object of the present invention is to provide a novel machine for the cracking of nuts.

A further object of the present invention is to provide a method for the cracking of nuts and which is particularly suited to the handling of nuts having very hard, tough, fibrous shells.

Referring to the drawing accompanying and forming a part hereof,

Figure 1 is a perspective view illustrating the essential working parts of a machine embodying the present invention.

Figure 2 is an enlarged end view of one of the electrodes, while Figure 3 is a section taken along the line 3—3 in Figure 2.

Referring to the drawings, the machine includes cooperating screws 6 and 7 which are suitably supported and which are rotated, as indicated by the arrows 6A and 7A respectively, in opposite directions to advance nuts to the ends of the screws 6 and 7, at which point the nut is received in a receptacle 8 at a nut shelling station, generally indicated at 9. Receptacle 8 has a horizontal recess 10 therein to receive and hold the nut momentarily and until it is engaged with the electrodes, as will be explained. The receptacle 8 is mounted upon one end 11A of a rod 11 which is supported in bearing 12; the other end 11B of rod 11 includes a cam follower 13 having a roller 14 thereon riding in a cam track 16 provided in a cam 17. Shaft 18 supports cam 17 for rotation. The support for shaft 18 is omitted for convenience, as is the source of power utilized to rotate shaft 18 continuously.

When the nut is supported at the nut shelling station 9, it is engaged by electrodes 21 and 22; the structure of the individual electrodes will be presently described in detail. The electrode 21 is fastened to insulating block 24A which, in turn, is fastened to rod 23A while the electrode 22 is fastened to insulating block 24B which, in turn, is fastened to rod 23B; the rods 23A and 23B are supported for movement by bearings 26A and 26B respectively. The rods 23A and 23B include cam followers 27A and 27B which have rollers 28A and 28B riding in cam tracks 29A and 29B of cams 31A and 31B. The cams 31A and 31B are supported by shafts 32A and 32B and are rotated in a counter-clockwise direction by miter gears 33A and 33B, which respectively engage miter gears 34A and 34B on shaft 18.

The previously described means suffice to bring the electrodes together and to grip a nut with a momentary pressure of the order of from a half to seven or even as high as ten tons, the form of the cam tracks 29A and 29B being such that the pressure application to the nut is momentary but quite positive. Even though the pressure is relatively great, it is insufficient to crack the nut and its effect is usually only to stress the fiber of the nut shells. It is preferred, additionally, to rotate one of the electrodes in engagement with the nut so that the nut is simultaneously compressed and subjected to torsion. To effect application of the desired twist to the nut, the rod 23A includes an extending arm 36 having a roller 37 thereon riding in a cam track 38 on a cam 39 while the rod 23B is restrained against rotation. The shaft 41 supports the cam 39, the shaft being driven by a mitre gear 42 engaged with a like mitre gear 43 on a countershaft 44. Mitre gear 46 on countershaft 44 is enmeshed with mitre gear 47 on shaft 48, the latter being driven by a mitre gear 49 engaged with a mitre gear 51 on the shaft 32B.

To retain the nut in place at the shelling station 9 until the electrodes engage the nut, a complementary support member 56 is mounted upon a rod 57, a spring 58 being provided between support member 56 and bearing support 59 to permit movement of the support member and avoid application of a disturbing pressure transversely of the nut during its positioning. The rod 57 is mounted for reciprocation in a fixed bearing support member 59 and has at its upper end a cam follower 61 with a roller 62 which rides in the cam track 63 of cam 64. The cam 65 is mounted on shaft 48.

Referring particularly to Figures 2 and 3, it is to be noted that the electrodes are relatively massive and of a size to engage a substantial portion of the nut on opposite sides thereof and serve to bring the nut into final alignment. In the form shown, the electrodes are cylindrical and each has a concave recess 72 therein with a plurality of intersecting knife edges 73 arranged radially of the concave recess 72. In the form shown in the drawing, I have utilized four such radial knife edges, but more or less can be used as desired, depending upon the degree of torsion to be applied.

In operation, with screws 6 and 7 and shaft 18 being rotated continuously, the nuts are advanced in timed relation and are supported at the shelling station 9 momentarily until engaged between the electrodes. An electric conductor 81 is connected to electrode 21 and an electrical conductor 82 is connected to electrode 22. Simultaneously with the application of the maximum pressure and torsion so that nut fibres are stressed greatly, the electrical potential is applied as a surge to the electrodes by conductors 81 and 82. The result is a shattering of the toughest nut.

The nuts are usually at atmospheric temperature although on some nuts, such as pecans, improved results are attained by having the nut at a relatively low temperature, e. g., 35° F., and even below 32° F.

The showing of the prime mover, supports for shafts 18, 32A and 32B, 44 and 48, and bearings 12, 26 and 59, have been omitted for convenience in illustrating the device.

I claim:

1. A machine for cracking nuts having hard, thick shells such as babassu nuts and the like, comprising a pair of pressure exerting electrodes positioned in axial alignment, a nut-shelling station, means for delivering a nut to said station, means for moving said electrodes into engagement with a nut and exerting a compressive force over substantial areas on the order of at least 1,000 pounds on a nut in said station, means for actuating one electrode with respect to the other whereby a torsional force is applied to a nut, said combination of compressive and torsional force being insufficient to crack a nut, and means for applying a high voltage electrical impulse discharge to a nut while a nut is subjected to said forces, said discharge being sufficient to crack a nut subjected to said forces but being insufficient to crack a nut in the absence of said forces.

2. A machine for cracking nuts having hard, thick shells such as babassu nuts and the like, comprising a pair of pressure exerting electrodes positioned in axial alignment, a nut-shelling station, means for delivering nuts one after another to said shelling station, means for supporting a delivered nut temporarily at said station, means for moving said electrodes into engagement with a temporarily supported nut at said station and exerting a compressive force over substantial areas on the order of at least 1,000 pounds on said nut, means for removing said temporary support from the nut upon engagement with said electrodes, means for actuating one electrode with respect to the other whereby a torsional force is applied to a nut, said combination of compressive and torsional force being insufficient to crack a nut, and means for applying a high voltage electrical impulse discharge to a nut while a nut is subjected to said forces, said discharge being sufficient to crack a nut subjected to said force but being insufficient to crack a nut in the absence of said forces.

3. A device as in claim 1 wherein each electrode has a relatively large recessed terminal end formed with a plurality of knife edges thereon to engage positively a substantial portion of a nut shell.

4. A device as in claim 2 wherein each electrode has a recessed terminal end formed with a plurality of knife edges thereon to engage positively a nut shell.

5. A machine for cracking hard shelled nuts comprising a nut receiving means, spaced electrodes adjacent said receiving means to engage nuts thereon, said electrodes having opposed nut-engaging surface, each surface being of substantial area, and electrical conductors and pressure applying means operatively connected to each electrode whereby physical pressure and electrical potential may be simultaneously applied to a nut between said electrodes.

6. The machine of claim 5 wherein the pressure applying means also applies a torsional force to the nut.

7. The machine of claim 6 wherein the pressure applying means applies a pressure on the order of at least a ton.

8. The machine of claim 6 wherein the electrodes have recessed terminal ends with a plurality of knife edges thereon to engage positively a substantial portion of the nut shell.

References Cited in the file of this patent

UNITED STATES PATENTS

| Number | Name | Date |
|---|---|---|
| 842,398 | Gebhardt | Jan. 29, 1907 |
| 1,250,140 | Chapman | Dec. 18, 1917 |
| 1,440,744 | Phillipe | Jan. 2, 1923 |
| 1,461,410 | Aldrich | July 10, 1923 |
| 1,703,989 | Colecliffe et al. | Mar. 5, 1929 |
| 1,927,847 | Resser | Sept. 26, 1933 |
| 1,965,460 | Gebhardt | July 3, 1934 |
| 2,065,544 | Strong | Dec. 29, 1936 |
| 2,200,405 | Watson | May 14, 1940 |
| 2,230,790 | Anderson | Feb. 4, 1941 |
| 2,248,368 | Low | July 8, 1941 |
| 2,308,860 | Clark | Jan. 19, 1943 |
| 2,365,576 | Meaker et al. | Dec. 19, 1944 |
| 2,609,942 | Kofoid | Sept. 9, 1952 |
| 2,685,312 | Mulvany et al. | Aug. 3, 1954 |